United States Patent
Asama et al.

(10) Patent No.: US 6,482,464 B1
(45) Date of Patent: Nov. 19, 2002

(54) GAS-INCORPORATED CHOCOLATE AND ITS PRODUCTION

(75) Inventors: Koji Asama, Izumisano (JP); Kazuhisa Yamada, Izumisano (JP); Atsushi Nago, Izumisano (JP)

(73) Assignee: Fuji Oil Company, Limited, Osaka-Fu (JP)

( * ) Notice: Subject to any disclaimer, the term of this patent is extended or adjusted under 35 U.S.C. 154(b) by 0 days.

(21) Appl. No.: 09/807,217

(22) PCT Filed: Jul. 11, 2000

(86) PCT No.: PCT/JP00/04619

§ 371 (c)(1),
(2), (4) Date: Apr. 11, 2001

(87) PCT Pub. No.: WO01/15544

PCT Pub. Date: Mar. 8, 2001

(30) Foreign Application Priority Data

Aug. 31, 1999 (JP) ............................................. 11-244305

(51) Int. Cl.⁷ .................................................. A23G 1/00
(52) U.S. Cl. ........................ 426/631; 426/312; 426/474; 426/564
(58) Field of Search ................................. 426/631, 660, 426/564–566, 312, 313, 474

(56) References Cited

U.S. PATENT DOCUMENTS

| | | | |
|---|---|---|---|
| 4,272,558 A | * 6/1981 | Bouette | 426/312 |
| 4,410,555 A | * 10/1983 | Richardson | 426/572 |
| 5,066,510 A | 11/1991 | Ehrman et al. | |
| 5,120,566 A | * 6/1992 | Baba et al. | 426/631 |
| 5,126,160 A | * 6/1992 | Giddey et al. | 426/564 |
| 5,362,508 A | 11/1994 | Wheeler et al. | |
| 5,370,888 A | * 12/1994 | Hachiya et al. | 426/103 |
| 5,505,982 A | 4/1996 | Krawczyk et al. | |
| 5,958,489 A | * 9/1999 | Chiappa | 426/294 |
| 6,159,526 A | * 12/2000 | Morikawa et al. | 426/611 |
| 6,197,356 B1 | * 3/2001 | Girsh | 424/810 |

FOREIGN PATENT DOCUMENTS

| | | |
|---|---|---|
| EP | 0 407 347 | 1/1991 |
| EP | 0 285 187 | 11/1991 |
| JP | 62-275648 | * 11/1987 |
| JP | 63-202341 | 8/1988 |
| JP | 05-284911 | * 11/1993 |
| JP | 08-038055 | * 2/1996 |
| WO | 98/30108 | 7/1998 |

* cited by examiner

Primary Examiner—Carolyn Paden
(74) Attorney, Agent, or Firm—Wenderoth, Lind & Ponack, L.L.P.

(57) ABSTRACT

There is disclosed gas-incorporated chocolate, in particular, air-incorporated chocolate whose chocolate material requires tempering and comprises a polyglycerin fatty acid ester and lecithin, said chocolate material being subjected to tempering with a seed agent. Its production is also disclosed. The gas-incorporated chocolate has light mouthfeel without an oily taste and can be produced with a simple apparatus.

5 Claims, No Drawings

GAS-INCORPORATED CHOCOLATE AND ITS PRODUCTION

TECHNICAL FIELD

The present invention relates to gas-incorporated chocolate, in particular, air-incorporated chocolate such as so-called "air chocolate" or "whipped chocolate", and its production. More specifically, it relates to gas-incorporated chocolate of a tempering-requiring type which can be produced by using a simple apparatus such as a vertical mixer, and its production.

BACKGROUND ART

Recently, for giving light mouthfeel to chocolate, many chocolate products which are combined with other confectionery such as baked confectionery, e.g., biscuit, have been marketed. In addition, there are so-called "air chocolate" and "whipped chocolate" whose chocolate material itself contain bubbles (cells) so that its specific gravity is lowered to give light mouthfeel to the chocolate.

For giving light mouthfeel to chocolate by incorporation of bubbles into a chocolate material, several methods have been proposed. For example, a chocolate material is agitated to incorporate air into the chocolate material to some extent, followed by maintaining it at reduced pressure to lower specific gravity of the chocolate material (JP-A 63-202341), or gas is incorporated in a chocolate material under pressurized conditions, followed by depressurization to atmospheric pressure to lower specific gravity of the chocolate material (JP-A 63-49040). Further, whipped shortening is mixed with a chocolate material to lower specific gravity thereof (JP-A 63-28355), or a fat containing a certain amount or more of triglycerides whose constituent fatty acid residues have 58 or more carbon atoms in total is formulated in a chocolate material so that bubbles formed by whipping are stabilized by crystals of the fat to lower specific gravity of the chocolate material (JP-A 3-201946).

Among these conventional methods for giving light mouthfeel to chocolate by incorporation of bubbles into a chocolate material, the method for incorporation of bubbles at reduced pressure or under pressurized conditions can sufficiently lower specific gravity of a chocolate material. However, the method requires large-scale facilities and is not suitable for simple production of gas-incorporated chocolate.

When gas-incorporated chocolate is produced by mixing a chocolate material with whipped shortening, it is necessary to use a large amount of shortening to sufficiently lower specific gravity. Then, there is such a problem that the fat content of chocolate becomes higher. In addition, since bubbles are formed only by whipping shortening, bubbles formed are coated with the fat and, upon mixing with a chocolate material, the taste of the resultant chocolate becomes more oily.

When bubbles formed by whipping are stabilized by the above fat crystals of a chocolate material itself, crystallization and solidification of the chocolate material proceed with time after whipping, which makes it difficult to maintain physical properties such as fluidity, etc. of the chocolate material. Then, in order to obtain an end product of good and constant quality, very high technology are required for setting up a series of apparatuses and production conditions.

On the other hand, it has been known that, when a polyglycerin fatty acid ester having medium HLB is used, whipping can be carried out at about 30 to 40° C. to form stable bubbles without requiring fat crystals of a chocolate material, and this technology can be used for frozen confectionery and coatings for cakes. However, this technology has not been able to be utilized for chocolate of a tempering-requiring type.

Furthermore, in addition to the above method using a fat containing a certain amount or more of triglycerides whose constituent fatty acid residues have 58 or more carbon atoms in total, it has been proposed to use stable crystals mainly composed of 1,3-dibehenyl-2-oleylglycerin (BOB, total carbon atoms of constituent fatty acids residues: 62) for tempering chocolate. However, even if the stable crystals are added to a chocolate material, its specific gravity cannot be lowered significantly.

OBJECTS OF THE INVENTION

An object of the present invention is to provide gas-incorporated chocolate of a tempering-requiring type having light mouthfeel without an oily taste.

Another object of the present invention is to provide a process for producing the gas-incorporated chocolate without using a special apparatus.

These and other objects as well as advantages of the present invention will become apparent to those skilled in the art from the following description.

SUMMARY OF THE INVENTION

As a result of intensive study, the present inventors have succeeded in the production of gas-incorporated chocolate of a tempering-requiring type without using a special apparatus.

That is, according to the present invention, there is provided gas-incorporated chocolate whose chocolate material requires tempering and comprises a polyglycerin fatty acid ester and lecithin, said chocolate material being subjected to tempering with a seed agent.

Further, the present invention provides a process for producing gas-incorporated chocolate whose chocolate material requires tempering and comprises a polyglycerin fatty acid ester and lecithin, said process comprising adjusting the total fat content of the chocolate to 30 to 50% by weight, and subjecting the chocolate material to tempering with a seed agent, while agitating the chocolate material so that gas is incorporated therein to bring specific gravity to 0.5 to 1.0.

DETAILED DESCRIPTION OF THE INVENTION

In the present invention, gas to be incorporated in a chocolate material may be any gas to be used for whipping edible materials and, normally, air.

The term "chocolate material" used herein means an intermediate product such as liquid chocolate to be subjected to tempering during chocolate processing.

In the present invention, chocolate itself is not limited to a specific one as far as the chocolate material requires tempering (chocolate of a tempering-requesting type) and bubbles are incorporated therein. The chocolate includes sweet chocolate and milk chocolate. Further, the chocolate also includes white chocolate (chocolate without cocoa particles).

The fat ingredient of the chocolate of a tempering-requiring type of the present invention is mainly composed of one or more members selected from the group consisting of cocoa butter and cocoa butter substitutes which can be replaced with cocoa butter arbitrarily in view of their physical properties, that is, in general, 1,3-saturated, 2-oleic acid triglycerides whose constituent fatty acid residues at 1- and 3-positions are saturated fatty acid residues and that at 2-position is oleic acid residue. Preferably, the total fat content of the chocolate of the present invention is 30 to 50% by weight, more preferably 40 to 45% by weight. When the total fat content is lower than this range, sufficient lowering of specific gravity is hardly expected. On the other hand, when the total fat content is higher than this range, the resultant chocolate has a less chocolate flavor and becomes relatively oily, though specific gravity is lowered sufficiently.

The polyglycerin fatty acid ester to be used in the present invention is preferably that having a polymerization degree of glycerin molecules of 2 to 4, and HLB of 8 to 10. Examples of the fatty acid include that having 12 to 22 carbon atoms or a mixture thereof. Lecithin may be that normally used in the chocolate production. Preferably, the polyglycerin fatty acid ester is used in an amount of 0.2 to 5% by weight, more preferably 0.5 to 3% by weight based on the total weight of the chocolate. Lecithin is used in an amount of, preferably 0.1 to 3% by weight, more preferably 0.2 to 2% by weight based on the total weight of the chocolate. When the amount of these emulsifiers is lower than these ranges, specific gravity of the chocolate cannot sufficiently be lowered. On the other hand, the amount of these emulsifiers is higher than these ranges, a taste of chocolate tends to become bad, though specific gravity is lowered.

When the chocolate of the present invention contains about 20% by weight or more of milk solids, some times, it is difficult to lower specific gravity. In such a case, preferably, in addition to the above emulsifiers, a polyglycerin condensed ricinoleate or a sucrose fatty acid ester is added to the chocolate material in an amount 0.05 to 3% by weight based on the chocolate material to sufficiently lower specific gravity. Preferably, the sucrose fatty acid ester has HLB of 1 to 3 and the examples of the fatty acid include that having 12 to 22 carbon atoms or a mixture thereof.

The seed agent to be used in the present invention is stable crystals (β-form crystals) of cocoa butter or symmetrical triglycerides mainly composed of 1,3-distearoyl-2-oleoylglycerin (SOS) or 1,3-dibehenyl-2-oleoylgrycerin (BOB). If necessary, the seed agent may be a commercially available product which is prepared by dispersing the stable crystals in a dispersing medium such as a chocolate ingredient, for example, non-crystallized fat, saccharide, etc. When the symmetrical triglycerides are mainly composed of 1,3-distearoyl-2-oleoylglycerin (SOS), preferably, the seed agent is used in an amount of 0.005 to 10% by weight based on the weight of the chocolate material. If the amount of the seed agent is lower than this range, no favorable effect of the addition is expected. On the other hand, if the amount of the seed agent is higher than this range, no increase in favorable effect is expected. When the symmetrical triglycerides are mainly composed of 1,3-dibehenyl-2-oleoylglycerin (BOB), preferably, the seed agent is used in an amount of 0.2 to 7% by weight, more preferably 0.5 to 2% by weight based on the weight of the chocolate material. If the amount of the seed agent is lower than this range, no favorable effect of the addition is expected. On the other hand, if the amount of the seed agent is higher than this range, the seed agent causes bad meltability in the mouth.

Other ingredients to be formulated are not specifically limited unless otherwise stated and those normally used in the production of chocolate of a tempering-requesting type can be used.

Preferably, the gas-incorporated chocolate of the present invention has specific gravity of 0.5 to 1.0, more preferably 0.7 to 0.9. When the specific gravity is lower than 0.5, fluidity of chocolate is lost because the chocolate material contains too many bubbles, which causes bad workability thereafter, though mouthfeel becomes very light. On the other hand, when the specific gravity is higher than 1.0, light mouthfeel cannot be given to chocolate and mouthfeel of the resultant chocolate cannot be distinguished from that of conventional chocolate.

In the present invention, specific gravity is measured as follows. The gas-incorporated chocolate is filled in a container and the content is weighed. Then, the gas-incorporated chocolate filled in the container is replaced with water and the water is weighed. The weight of the content is divided by the weight of water to calculate the specific gravity.

The process for producing the gas-incorporated chocolate of the present invention is characterized in that the total fat content of the chocolate is adjusted to 30 to 50% by weight, and the chocolate material is subjected to tempering with the seed agent, while agitating the chocolate material so that gas is incorporated therein to bring to specific gravity of 0.5 to 1.0.

Tempering can be carried out according to a conventional manner.

The term "agitating" includes stirring, mixing or whipping. The agitation can be carried out by using a vertical mixer which is widely employed in confectionery production. The vertical mixer is equipped with stirring blade(s) such as whipper, beater, etc.

Other production steps can be carried out according to conventional chocolate processing.

The following Examples and Comparative Examples further illustrate the present invention in detail but are not to be construed to limit the scope thereof. In the Examples and Comparative Examples, all percents and parts are by weight.

EXAMPLE 1

Sweet chocolate composed of cocoa mass (32.3 parts), sugar (38.1 parts), cocoa butter (9.6 parts), palm mid fraction (Iodine Value (IV): 45, 14.6 parts), lecithin (0.9 part) and diglycerin monostearate (HLB 8, 0.9 part, "Poem DS-100" manufactured by Riken Vitamin K.K.) was melted completely and adjusted to 30 to 36° C. To this was added a seed agent (3.6 parts, content of stable crystals of BOB: 30%, "Bobstar" manufactured by Fuji Oil Co., Ltd.) and the mixture was whipped by agitating with Kenwood Mixer equipped with a beater at a high rate to obtain the desired gas-incorporated chocolate. When its specific gravity was measured, it was 0.75.

EXAMPLE 2

Chocolate composed of cocoa mass (32.3 parts), sugar (41.5 parts), cocoa butter (9.6 parts), palm mid fraction (IV: 45, 14.6 parts), lecithin (0.9 part) and diglycerin monostearate (HLB 8, 0.9 part, "Poem DS-100A" manufactured by Riken Vitamin K.K.) was melted completely and adjusted to 30 to 33° C. To this was added a seed agent (0.2 part, content of stable crystals of SOS: 13%, "Chocoseed" manufactured by Fuji Oil Co., Ltd.) and the mixture was whipped according to the same manner as described in Example 1 to obtain the desired gas-incorporated chocolate. When its specific gravity was measured, it was 0.77.

EXAMPLE 3

Milk chocolate composed of cocoa mass (11.7 parts), whole milk powder (17.7 parts), sugar (35.4 parts), cocoa butter (15.2 parts), palm mid fraction (IV: 45, 14.6 parts), lecithin (0.9 part) and diglycerin monostearate (HLB 8, 0.9 part, "Poem DS-100A" manufactured by Riken Vitamin K.K.) was melted completely and adjusted to 30 to 36° C. To this was added a seed agent (3.6 parts, "Bobstar" manufactured by Fuji Oil Co., Ltd.) and the mixture was whipped by agitating with Kenwood Mixer equipped with a beater at a high rate to obtain the desired gas-incorporated chocolate. When its specific gravity was measured, it was 0.83.

EXAMPLE 4

According to the same manner as described in Example 3, gas-incorporated chocolate was produced except that triglycerin monostearate (HLB 10, 0.9 part, "Sunsoft A-181C" manufactured by Taiyo Kagaku K.K.) was used instead of diglycerin monostearate. When its specific gravity was measured, it was 0.91.

EXAMPLE 5

According to the same manner as described in Example 3, gas-incorporated chocolate was produced except that triglycerin monooleate (HLB 10, 0.9 part, "Sunsoft A-171C" manufactured by Taiyo Kagaku K.K.) was used instead of diglycerin monostearate. When its specific gravity was measured, it was 0.90.

EXAMPLE 6

Milk chocolate composed of cocoa mass (11.7 parts), whole milk powder (17.7 parts), sugar (34.5 parts), cocoa butter (15.2 parts), palm mid fraction (IV: 45, 14.6 parts), lecithin (0.9 part) and diglycerin monostearate (HLB 8, 0.9 part, "Poem DS-100A" manufactured by Riken Vitamin K.K.) was melted completely and adjusted to 30 to 36° C. To this was added a seed agent (3.6 parts, "Bobstar" manufactured by Fuji Oil Co., Ltd.) and the mixture was whipped according to the same manner as described in Example 1 to obtain the desired gas-incorporated chocolate. When its specific gravity was measured, it was 0.78.

EXAMPLE 7

According to the same manner as described in Example 3, gas-incorporated chocolate was produced except that triglycerin monomyristate (HLB 10, 0.9 part, "Poem DM-100" manufactured by Riken Vitamin K.K.) was used instead of diglycerin monostearate. When its specific gravity was measured, it was 0.93.

p EXAMPLE 8

According to the same manner as described in Example 3, gas-incorporated chocolate was produced except that tetraglycerin monostearate (HLB 8, 0.9 part, "SY Glystar MS310" manufactured by Sakamaoto Yakuhin Kygyo Kagaku K.K.) was used instead of diglycerin monostearate. When its specific gravity was measured, it was 0.94.

EXAMPLE 9

White chocolate composed of whole milk powder (22.4 parts), sugar (35.2 parts), cocoa butter (22.4 parts), palm mid fraction (IV: 45, 14.7 parts), lecithin (0.8 part) and diglycerin monostearate (HLB 8, 0.9 part, "Poem DS-100A" manufactured by Riken Vitamin K.K.) was melted completely and adjusted to 30 to 36° C. To this was added a seed agent (3.6 parts, "Bobstar" manufactured by Fuji Oil Co., Ltd.) and the mixture was whipped by agitating with Kenwood Mixer equipped with a beater at a high rate to obtain the desired gas-incorporated chocolate. When its specific gravity was measured, it was 0.9.

EXAMPLE 10

Polyglycerin condensed ricinoleate (0.2 part, "SY Glystar CRS-75" manufactured by Sakamoto Seiyaku Kogyo K.K.) was added to white chocolate composed of whole milk powder (22.4 parts), sugar (35.0 parts), cocoa butter (22.4 parts), palm mid fraction (IV: 45, 14.7 parts), lecithin (0.8 part) and diglycerin monostearate (HLB 8, 0.9 part, "Poem DS-100A" manufactured by Riken Vitamin K.K.). The mixture was melted completely and adjusted to 30 to 36° C. To this was added a seed agent (3.6 parts, "Bobstar" manufactured by Fuji Oil Co., Ltd.) and the mixture was whipped according to the same manner as described in Example 1. When its specific gravity was measured, it was 0.86.

Each of the products of Examples 1 to 10 had lower specific gravity than that of conventional chocolate and lighter mouthfeel. Thus, the products of Examples 1 to 10 were clearly distinguished from conventional chocolate. In addition, they were produced with a simple apparatus without any difficulty.

The polyglycerin fatty acid ester used and characteristic of the gas-incorporated chocolate obtained are summarized in Table 1.

TABLE 1

| Example No. | Polyglycerin fatty acid ester | | Specific gravity of gas-incorporated | Mouthfeel of chocolate |
| --- | --- | --- | --- | --- |
| | Degree of polymerization | HLB | | |
| 1 | 2 | 8 | 0.75 | good |
| 2 | 2 | 8 | 0.77 | good |
| 3 | 2 | 8 | 0.83 | good |
| 4 | 3 | 10 | 0.91 | good |
| 5 | 3 | 10 | 0.9 | good |
| 6 | 2 | 8 | 0.78 | good |
| 7 | 2 | 9 | 0.93 | good |
| 8 | 4 | 8 | 0.94 | good |
| 9 | 2 | 8 | 0.9 | good |
| 10 | 2 | 8 | 0.86 | good |

COMPARATIVE EXAMPLE 1

According to the same manner as described in Example 3, gas-incorporated chocolate was produced except that diglycerin monostearate was not added. When its specific gravity was measured, it was 1.08.

COMPARATIVE EXAMPLE 2

According to the same manner as described in Example 3, gas-incorporated chocolate was produced except that monoglycerin monostearate (HLB 4, 0.9 part, "Excell T-95" manufactured by Kao Corporation) was used instead of diglycerin monostearate. When its specific gravity was measured, it was 1.04.

COMPARATIVE EXAMPLE 3

According to the same manner as described in Example 3, gas-incorporated chocolate was produced except that a mixture of diglycerin monostearate and diglycerin distearate (HLB 6.5, 0.9 part, "Sunsoft Q-18B" manufactured by Taiyo Kagaku Kogyo K.K.) was used instead of diglycerin monostearate was not added. When its specific gravity was measured, it was 1.05.

COMPARATIVE EXAMPLE 4

According to the same manner as described in Example 3, gas-incorporated chocolate was produced except that triglycerin monolaurate (HLB 12, 0.9 part, "Sunsoft A-121C" manufactured by Taiyo Kagaku Kogyo K.K.) was used instead of diglycerin monostearate was not added. When its specific gravity was measured, it was 1.04.

COMPARATIVE EXAMPLE 5

According to the same manner as described in Example 3, gas-incorporated chocolate was produced except that pentaglycerin monostearate (HLB 13, 0.9 part, "Sunsoft A-181E" manufactured by Taiyo Kagaku Kogyo K.K.) was used instead of diglycerin monostearate was not added. When its specific gravity was measured, it was 1.02.

COMPARATIVE EXAMPLE 6

According to the same manner as described in Example 3, gas-incorporated chocolate was produced except that decaglycerin monostearate (HLB 12, 0.9 part, "Sunsoft Q-18S" manufactured by Taiyo Kagaku Kogyo K.K.) was used instead of diglycerin monostearate was not added. When its specific gravity was measured, it was 1.12.

COMPARATIVE EXAMPLE 7

According to the same manner as described in Example 3, gas-incorporated chocolate was produced except that monoglycerin monostearate lactate (HLB 7.5, 0.9 part, "Sunsoft No. 661AS" manufactured by Taiyo Kagaku Kogyo K.K.) was used instead of diglycerin monostearate was not added. When its specific gravity was measured, it was 1.08.

COMPARATIVE EXAMPLE 8

According to the same manner as described in Example 3, gas-incorporated chocolate was produced except that monoglycerin monostearate (HLB 2.5, 0.9 part, "Sunfat S-11" manufactured by Taiyo Kagaku Kogyo K.K.) was used instead of diglycerin monostearate was not added. When its specific gravity was measured, it was 1.12.

The polyglycerin fatty acid ester used and characteristics of the gas-incorporated chocolate obtained are summarized in Table 2.

TABLE 2

| Comp. Example No. | Polyglycerin fatty acid ester | | Specific gravity of gas-incorporated | Mouthfeel of chocolate |
| | Degree of polymerization | HLB | | |
| --- | --- | --- | --- | --- |
| 1 | — | — | 1.08 | heavy |
| 2 | 1 | 4 | 1.04 | heavy |
| 3 | 2 | 6.5 | 1.05 | heavy |
| 4 | 3 | 12 | 1.04 | heavy |
| 5 | 5 | 13 | 1.02 | heavy |
| 6 | 10 | 12 | 1.12 | heavy |
| 7 | 1 | 7.5 | 1.08 | heavy |
| 8 | 1 | 2.5 | 1.12 | heavy |

As described hereinabove, gas-incorporated chocolate of the present invention can be produced without al apparatus to give light mouthfeel to chocolate.

What is claimed is:

1. Gas-incorporated chocolate whose chocolate material requires tempering and comprises a polyglycerin fatty acid ester and lecithin, said chocolate material being subjected to tempering with a seed agent, wherein the polyglycerin fatty acid ester is that having a polymerization degree of glycerin molecules of 2 to 4 and HLB of 8 to 10.

2. Gas-incorporated chocolate whose chocolate material requires tempering and comprises a polyglycerin fatty acid ester and lecithin, said chocolate material being subjected to tempering with a seed agent, which gas-incorporated chocolate having a total fat content of 30 to 50% by weight and specific gravity of 0.5 to 1.0.

3. A process for producing a gas-incorporated chocolate whose chocolate material requires tempering and comprises a polyglycerin fatty acid ester and lecithin, which comprises adjusting the total fat content of the chocolate to 30 to 50% by weight, and subjecting the chocolate material to tempering with a seed agent, while agitating the chocolate material so that gas is incorporated therein to bring to specific gravity of 0,5 to 1.0.

4. The process according to claim 3, wherein air is incorporated in the chocolate material.

5. The process according to claim 3, wherein the chocolate material is agitated with a vertical mixer.

* * * * *